US012644794B2

(12) United States Patent
Aundhkar et al.

(10) Patent No.: US 12,644,794 B2
(45) Date of Patent: Jun. 2, 2026

(54) VARIABLE PITCH FAN BELT FAILURE PREDICTION SYSTEM AND METHOD

(71) Applicant: DEERE & COMPANY, Moline, IL (US)

(72) Inventors: Sarvesh Aundhkar, Kolhapur (IN); Darren J. Cruchelow, Ankeny, IA (US); Logan K. Trueblood, Port Byron, IL (US); Todd E. Van Hal, Eldridge, IA (US)

(73) Assignee: Deere & Company, Moline, IL (US)

( * ) Notice: Subject to any disclaimer, the term of this patent is extended or adjusted under 35 U.S.C. 154(b) by 79 days.

(21) Appl. No.: 18/612,012

(22) Filed: Mar. 21, 2024

(65) Prior Publication Data

US 2025/0297920 A1     Sep. 25, 2025

(51) Int. Cl.
 F04D 29/36 (2006.01)
 G01M 13/023 (2019.01)
 G07C 5/08 (2006.01)

(52) U.S. Cl.
 CPC ......... G01M 13/023 (2013.01); G07C 5/0816 (2013.01)

(58) Field of Classification Search
 CPC .......................... G01M 13/023; G07C 5/0816
 See application file for complete search history.

(56) References Cited

U.S. PATENT DOCUMENTS

| | | | | |
|---|---|---|---|---|
| 5,488,881 | A | * | 2/1996 | Lin ......................... F16H 49/00 |
| | | | | 464/178 |
| 6,358,142 | B1 | * | 3/2002 | Imel ........................ A01F 12/28 |
| | | | | 460/109 |
| 6,503,142 | B2 | | 1/2003 | Imel et al. |
| 8,313,361 | B2 | * | 11/2012 | Flickinger ............... A01F 12/24 |
| | | | | 460/109 |
| 11,274,676 | B2 | * | 3/2022 | Morreale ................ F01D 25/16 |
| 11,317,566 | B2 | | 5/2022 | Koudela |
| 2016/0025102 | A1 | * | 1/2016 | Benevelli ................ F04D 25/02 |
| | | | | 416/1 |
| 2016/0295802 | A1 | * | 10/2016 | De Witte ................ A01F 12/24 |
| 2016/0345499 | A1 | * | 12/2016 | Van Hullebusch ....... A01F 7/06 |

FOREIGN PATENT DOCUMENTS

| | | | | |
|---|---|---|---|---|
| DE | 102016123182 | B4 | 5/2022 | |
| WO | WO-2014140149 | A1 * | 9/2014 | ........... F04D 29/362 |

* cited by examiner

*Primary Examiner* — Masud Ahmed
(74) *Attorney, Agent, or Firm* — Taft Stettinius & Hollister LLP; Stephen F. Rost

(57) ABSTRACT

A variable pitch fan system for an agricultural machine includes an engine, a fan, a pulley assembly and a controller. The engine powers the agricultural machine, including by driving rotation of a drive wheel of the pulley assembly. The fan includes a plurality of blades having variable pitch. The pulley assembly includes the drive wheel, a belt that is rotationally driven by the drive wheel, and a fan wheel that is rotationally driven by the belt to drive rotation of the fan. The controller receives one or more signals from at least one of a belt load sensor and fan sensor indicative of a load on the belt and a speed of the fan, respectively. The controller also receives one or more signals from at least one engine sensor indicative of a speed of the engine. The controller assesses variable pitch fan system failure based on the received signals.

14 Claims, 7 Drawing Sheets

VARIABLE PITCH FAN BELT FAILURE PREDICTION SYSTEM AND METHOD

FIELD OF THE DISCLOSURE

The present disclosure relates to agricultural machines and, in particular, to systems and methods for failure prediction in agricultural machines having a variable pitch fan.

BACKGROUND OF THE DISCLOSURE

There are a variety of different types of agricultural machines. Some agricultural machines include combine harvesters, sugar cane harvesters, cotton harvesters, self-propelled forage harvesters, produce harvesters, and wind-rowers. Any of these agricultural machines and others may include a cooling system that includes a variable pitch fan to modulate airflow rate and direction, for example, to remove debris from a portion of the cooling system.

SUMMARY

In an illustrative implementation, a variable pitch fan system for an agricultural machine comprises: an engine configured to produce power; a fan including a plurality of blades extending radially outward from an axis about which the plurality of blades rotates, the plurality of blades having variable pitch; a pulley assembly including: a drive wheel configured to be rotationally driven by the engine; a belt configured to be rotationally driven by the drive wheel; and a fan wheel configured to be rotationally driven by the belt to drive rotation of the plurality of blades of the fan; and a controller configured to receive one or more signals from at least one fan sensor indicative of a measured speed of the fan.

In some implementations, in a first configuration, the fan is configured to provide airflow in a first direction toward the engine, and, in a second configuration, the fan is configured to provide airflow in a second direction away from the engine. In some implementations the controller is configured to receive one or more signals from at least one engine sensor indicative of a speed of the engine. In some implementations, the at least one engine sensor is a hall effect sensor; and the at least one fan sensor is a hall effect sensor.

In some implementations, the controller is configured to determine an expected speed of the fan based on the second parameter received from the at least one engine sensor. In some implementations, the controller is configured to determine the expected speed of the fan further based on a pulley ratio between the drive wheel and the fan wheel. In some implementations, the controller is configured to determine the expected speed of the fan further based on a coefficient of friction between the belt and at least one of the drive wheel and the fan wheel. In some implementations, the controller is configured to determine the expected speed of the fan further based on at least one ambient condition factor, and the at least one ambient condition factor includes at least one of ambient air temperature and ambient air density. In some implementations, the controller is config-ured to determine the expected speed of the fan further based on an age of the belt. In some implementations, the con-troller is configured to determine the expected speed of the fan further based on a quantity of fan blade reversal events. In some implementations, the controller is configured to determine the expected speed of the fan further based on a tension of the belt.

In some implementations, the controller is configured to compare the measured speed of the fan to the expected speed of the fan. In some implementations, the controller is configured to: determine a fan speed error value based on a difference between the speed of the fan indicated by the at least one fan sensor and the expected speed of the fan, and the controller is configured to send one or more signals to a user interface of the agricultural machine causing the user interface to provide an alert if the fan speed error value is outside a tolerance for the fan speed error value.

In another illustrative implementation, a method of assessing a variable pitch fan system for an agricultural machine comprises: measuring a parameter indicative of a speed of a fan, the fan including a plurality of blades having variable pitch; measuring a parameter indicative of a speed of an engine that is configured to produce power for the agricultural machine; receiving the parameter indicative of the speed of the fan and the parameter indicative of the speed of an engine; determining an expected speed of the fan based on the indicative of the speed of an engine; determining a difference between the measured speed of the fan and the expected speed of the fan, wherein the difference is a fan speed error value; and providing an alert if the fan speed error value is outside a tolerance for the fan speed error value.

In another illustrative implementation, a variable pitch fan system for an agricultural machine comprises: an engine configured to produce power; a fan including a plurality of blades extending radially outward from an axis about which the plurality of blades rotates, the plurality of blades having variable pitch; a pulley assembly including: a drive wheel configured to be rotationally driven by the engine; a belt configured to be rotationally driven by the drive wheel; and a fan wheel configured to be rotationally driven by the belt to drive rotation of the plurality of blades of the fan; and a controller configured to receive a parameter indicative of a load on the belt from the at least one load sensor.

In some implementations, the controller is configured to receive a parameter indicative of a speed of the engine from at least one engine sensor; and the controller is configured to determine an expected load on the belt based on the param-eter indicative of a speed of the engine.

In some implementations, the controller is configured to determine the expected load on the belt further based on the pitch of the plurality of blades of the fan. In some imple-mentations, the controller is configured to determine the expected load on the belt further based on a density value of ambient air.

In some implementations, the controller is configured to: compare the measured load on the belt to the expected load on the belt. In some implementations, the controller is configured to determine a belt load error value based on a difference between the measured load on the belt and the expected load on the belt. In some implementations, the controller is configured to cause an alert to be provided by a user interface of the agricultural machine if the belt load error value is outside a tolerance for the belt load error value.

In some implementations, the controller is configured to determine the expected load on the belt further based on at least one of: a coefficient of friction between the belt and at least one wheel of the pulley assembly, an ambient condition factor including at least one of ambient air temperature and ambient air density, an age of the belt, a quantity of fan blade reversal events, a measured tension value of the belt.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
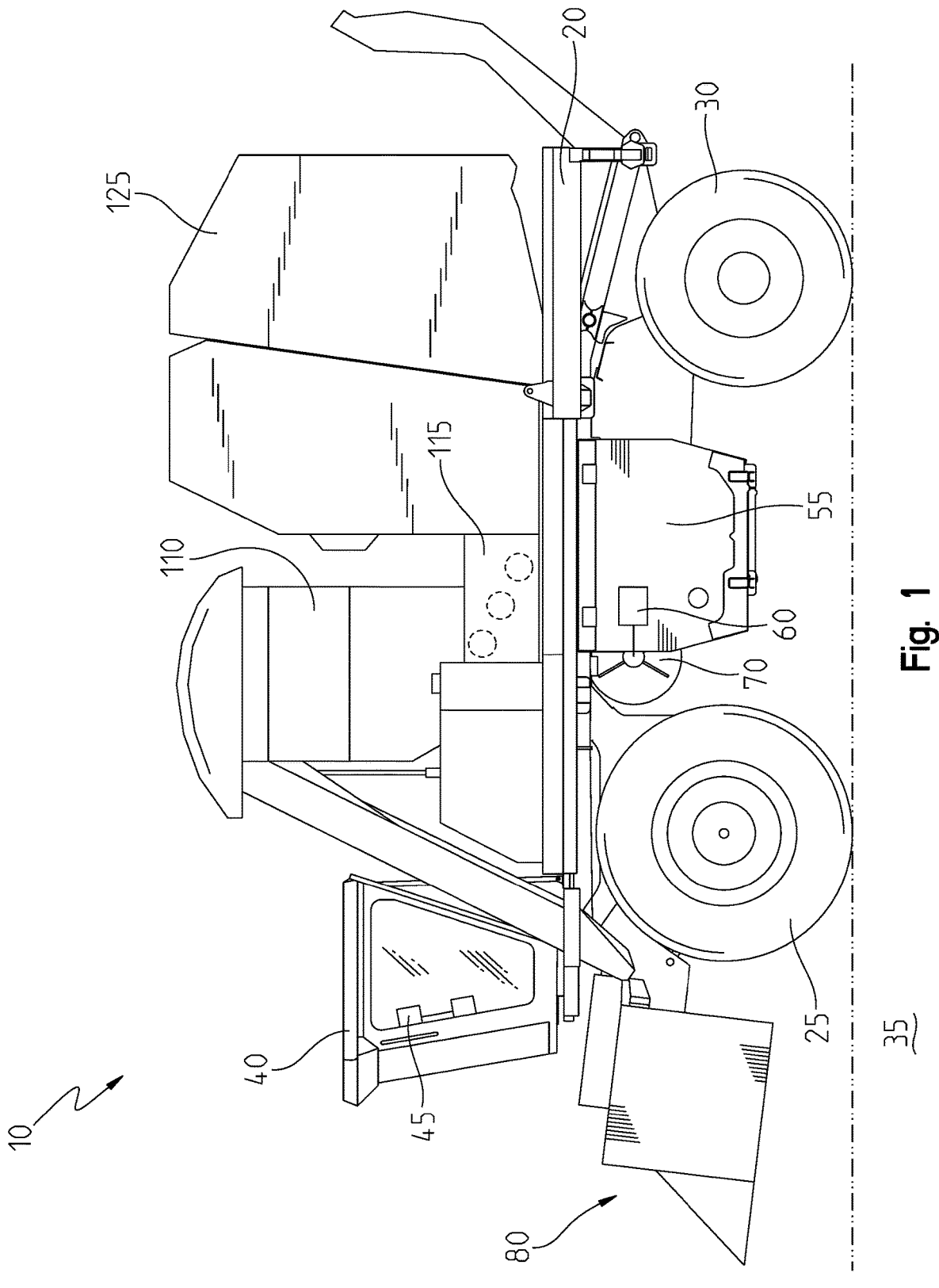
FIG. 1 is a side view of an exemplary agricultural machine.

In FIG. 1, an exemplary agricultural machine 10 is demonstrated as a cotton harvester. It should be appreciated that other types of harvesters and agricultural machines (e.g., combine harvesters, sugar cane harvesters, self-propelled forage harvesters, produce harvesters, and windrowers) are also contemplated by this disclosure and the systems and methods described herein are applicable to such other types of harvesters and agricultural machines.

In the illustrative implementation, the agricultural machine 10 includes a chassis 20, which is supported by front wheels 25 and rear wheels 30; however other support is contemplated (e.g., tracks). The agricultural machine 10 is adapted for movement through a field 35 to harvest crops (e.g., cotton, corn, stover, hay, alfalfa). The agricultural machine 10 includes an operator station 40 that is supported by the chassis 20. In the illustrative implementation, a user interface 45 is positioned in the operator station 40; however, in other implementations, the user interface 45 may be positioned elsewhere. In the illustrative implementation, the agricultural machine 10 includes an engine 55 that is embodied as a prime mover, which is the initial source of motive power for the agricultural machine 10. For example, in the illustrative implementation, the engine 55 drives a drive unit 60 (which, for example, may be embodied as a hydraulic motor, mechanical drive, or other rotational driver) that provides power to a variable pitch fan 70. In the illustrative implementation, a harvesting head 80 is coupled to the chassis 20 and configured to harvest crop from the field 35. In the illustrative implementation, the agricultural machine

10 includes various other components (e.g., an accumulator 110, a feeder 115, a baler 125) each configured to process the harvested crop.

Figure 2:
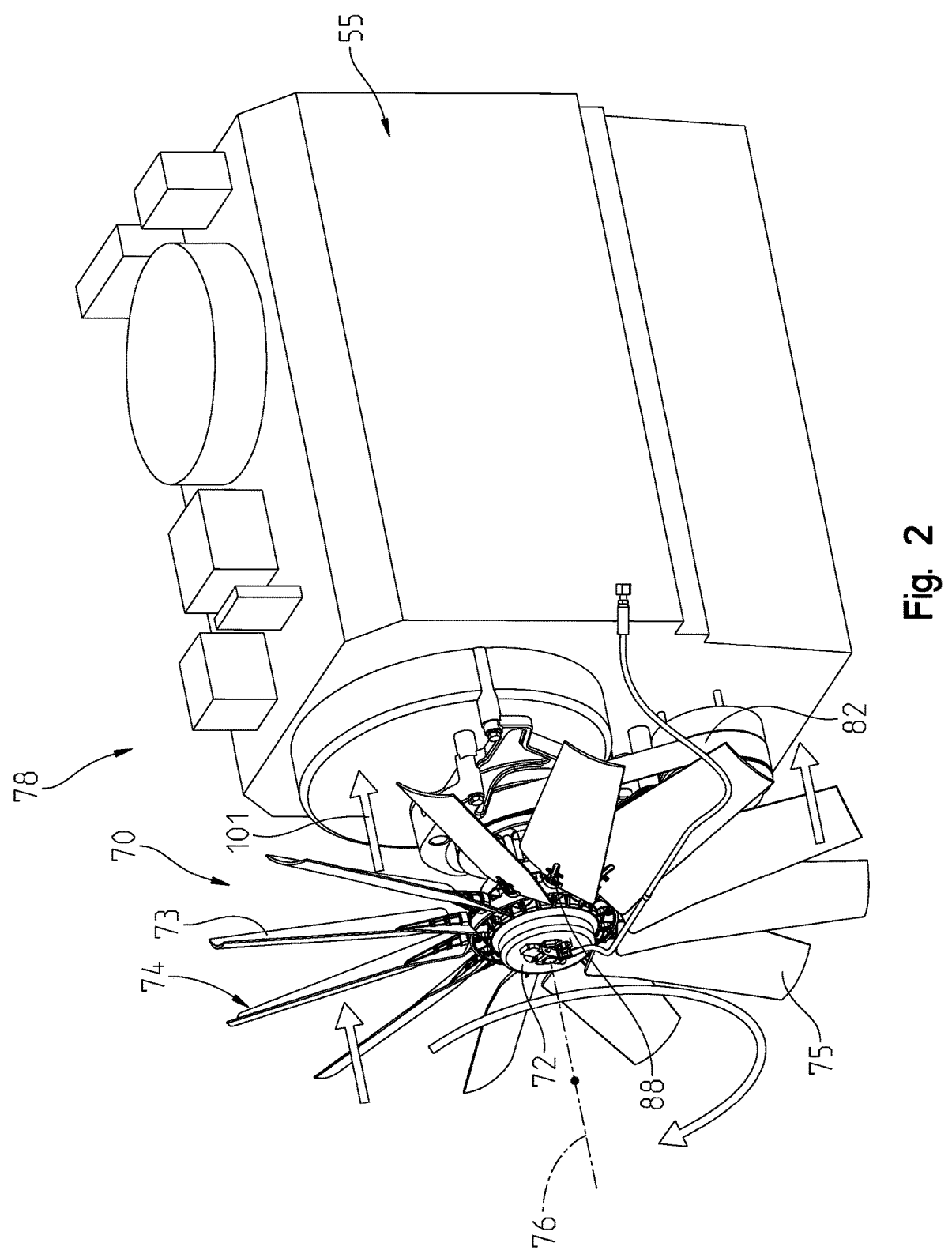
FIG. 2 is a perspective view of an exemplary variable pitch fan directing airflow in a first direction, an exemplary engine of the agricultural machine, and an exemplary pulley assembly of the agricultural machine that is illustratively coupled to the fan and the engine.
Figure 3:
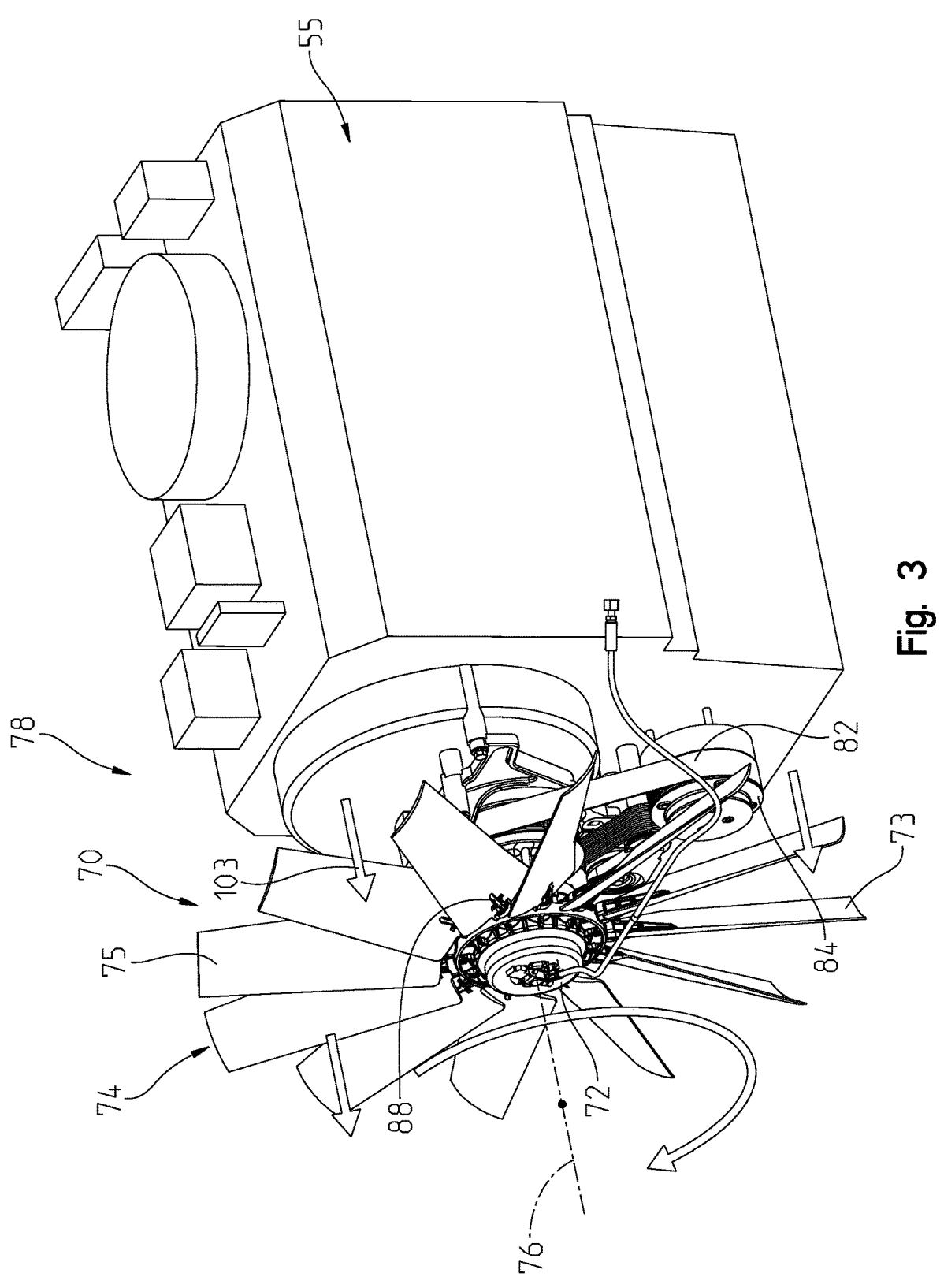
FIG. 3 is a perspective view of the variable pitch fan directing airflow in a second direction opposite the first direction, the engine of the agricultural machine, and the pulley assembly of the agricultural machine.

Referring now to FIG. 2, an exemplary illustration of the variable pitch fan 70 and the engine 55 is provided. The fan 70 is configured to rotate about an axis 76. The fan 70 includes a fan hub 72 (e.g., arranged concentrically about the axis 76) and a plurality of blades 74 extending radially outward from the fan hub 72 and from the axis 76. The plurality of blades 74 have variable pitch such that the plurality of blades 74 are rotatable relative to the fun hub 72 to vary their pitch. The fan blades 74 are configured to rotate about their respective longitudinal axes to vary pitch. As shown in FIGS. 2 and 3, for example, each fan blade 74 includes a first side 73 and a second side 75. In the illustrative implementation, the first side 73 is a concave side, and the second side 75 is a convex side.

In the illustrative implementation, as shown in FIG. 1, the fan 70 is coupled to the engine 55 and configured to rotate clockwise, e.g., to provide airflow in a first direction, shown by arrow 101, toward the engine 55 (see FIG. 2) and in a second direction, shown by arrow 103, away from the engine 55 (see FIG. 3). It should be appreciated that the fan 70 may cool other components of the agricultural machine 10 as well (e.g., radiator, charger air cooler, hydraulic oil cooler, air conditioner condenser, fuel cooler). During a fan blade reversal event, the pitch of the plurality of blades 74 is adjusted as the plurality of fan blades are reconfigured from a first configuration, in which clockwise rotation of the fan 70 creates airflow in the first direction shown by the arrow 101, to an additional configuration, in which clockwise rotation of the fan 70 creates airflow in the second direction shown by arrow 103. In the illustrative implementations, the term additional configuration of the plurality of fan blades includes a second configuration and a third configuration.

In the illustrative implementation, when the plurality fan blades 74 are in the first configuration (as shown in FIG. 2) and in the second configuration (as shown in FIG. 3), the first side 73 of each fan blade 74 faces toward the engine 55.

In another implementation contemplated by this disclosure, the plurality of fan blades 74 are adjustable to a third configuration. In such an implementation, when the fan blades 74 are in the first configuration, the first side 73 of each fan blade 74 faces toward the engine 55, and when the fan blades 74 are in the third configuration, the first side 73 of each fan blade 74 faces away from the engine 55. In the third configuration, clockwise rotation of the fan 70 creates airflow in the second direction shown by the arrow 103.

The third configuration may be advantageous over the second configuration, as the third configuration may provide additional airflow in the second direction relative to the second configuration because the first side 73 of each fan blade 74 (which, e.g., may be concave) faces away from the engine 55 in the third configuration.

Figure 4:
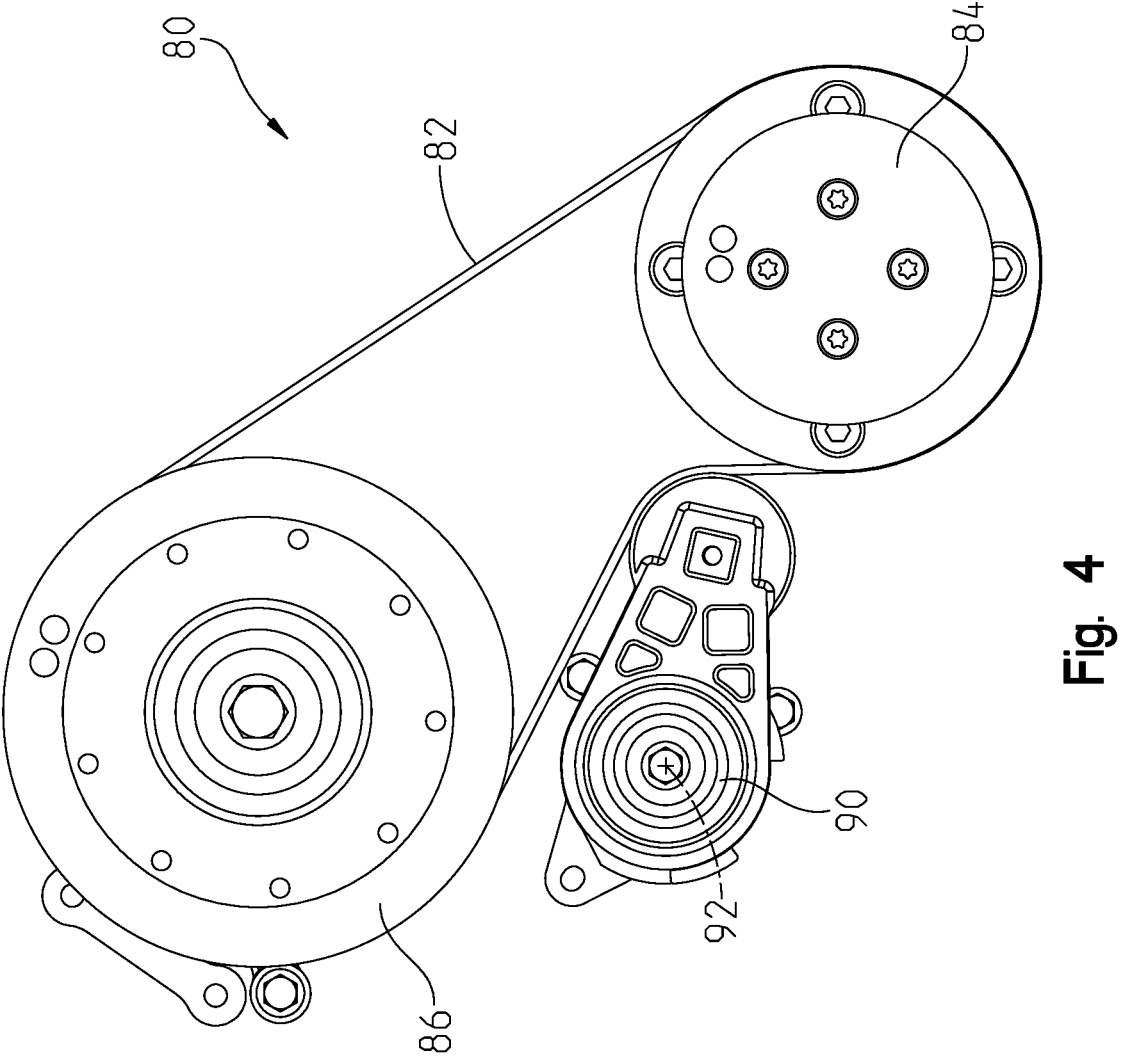
FIG. 4 is a front view of the pulley assembly of the agricultural machine.

In the illustrative implementation, the fan 70 and the engine 55 are included in a variable pitch fan system 78. The variable pitch fan system 78 further includes a pulley assembly 80, which is shown in FIG. 4. The pulley assembly 80, includes a belt 82, a drive wheel 84, and a fan wheel 86. The drive wheel 84 is coupled to and rotationally driven by the engine 55 (e.g., via the drive shaft of the drive unit 60) and configured to drive rotation of the belt 82. The fan wheel 86 is driven by the belt 82 and coupled to the fan hub 72. In the illustrative implementation, the fan wheel 86 is fixedly coupled to the fan hub 72 (for rotation therewith) such that rotation of the fan wheel 86 causes rotation of fan hub 72.

Referring still to FIG. 4, in the illustrative implementation, the pulley assembly 80 further includes a tensioner 90 configured to rotate about a tensioner axis 92 to adjust the tension in the belt 82.

Figure 5:
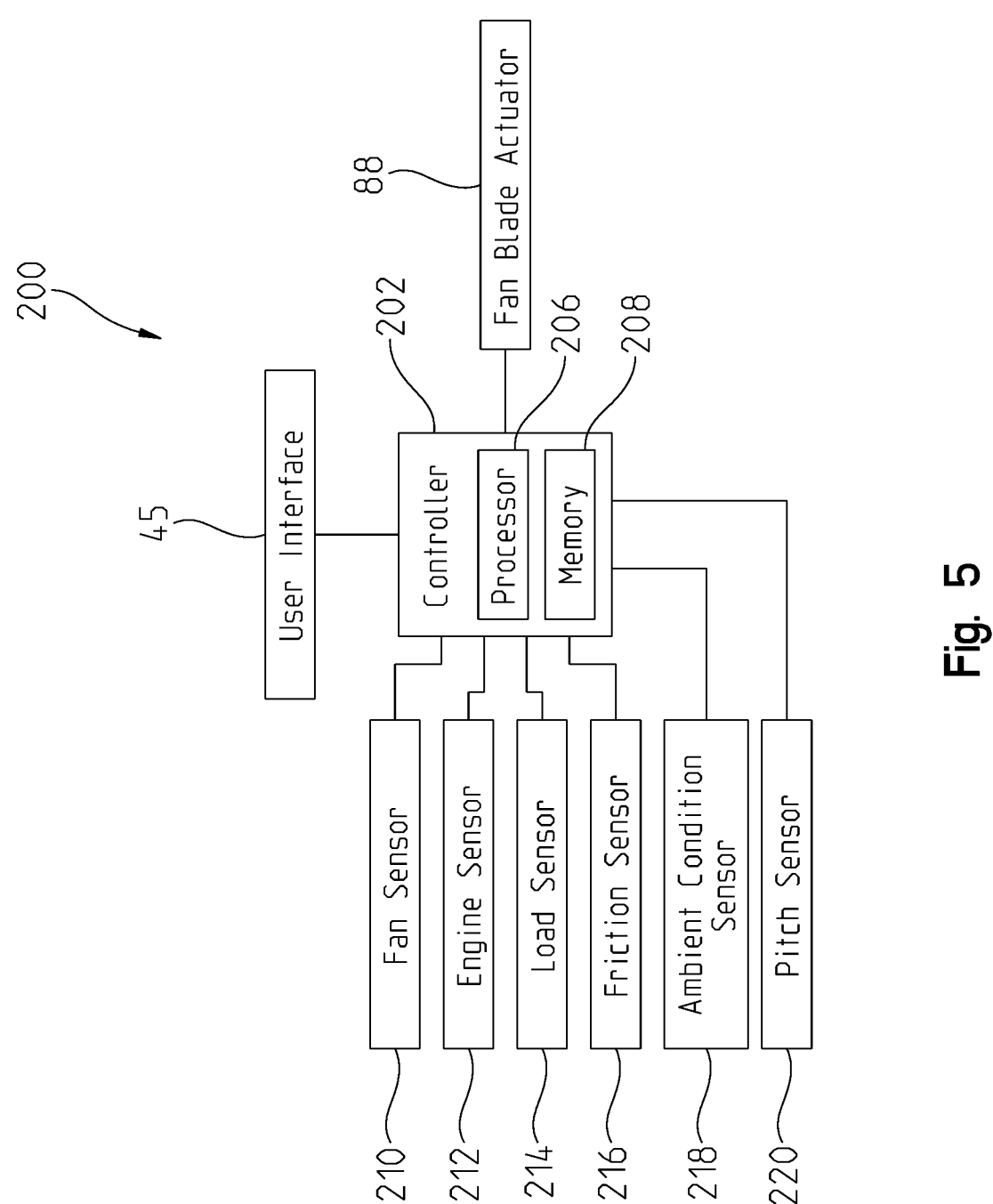
FIG. 5 is a diagrammatic view of an example control system for the agricultural machine.

In the illustrative implementation, the pitch of the fan blades 74 may be controlled by a control system 200. As shown in FIG. 5, in the illustrative implementation, the control system 200 includes a controller 202, one or more memories 208 included in or accessible by the controller 202, and one or more processors 206 included in or accessible by the controller 202. The one or more processors 206 are configured to execute instructions (e.g., one or more algorithms) stored on the one or more memories 208. The controller 202 may be a single controller or a plurality of controllers operatively coupled to one another. The controller 202 may be positioned on the agricultural machine 10 or positioned remotely, away from the agricultural machine 10. The controller 202 may be coupled via a wired connection or wirelessly to other components of the agricultural machine 10 and to one or more remote devices. In some instances, the controller 202 may be connected wirelessly via Wi-Fi, Bluetooth, Near Field Communication, or another wireless communication protocol to other components of the agricultural machine 10 and to one or more remote devices.

As shown in FIG. 5, in the illustrative implementation, the controller 202 is operatively coupled to at least one fan blade actuator 88. The controller 202 is configured to send one or more signals to the at least one fan blade actuator 88 causing rotation of the plurality of blades 74 relative to the fan hub 72 to vary the pitch of the plurality of blades 74. In the illustrative implementation, the controller 202 is operatively to the user interface 45. In some implementations, the controller 202 is configured to receive one or more signals from the user interface 45 associated with the pitch of the plurality of blades 74, and the controller 202 causes adjustment of pitch in response to the one or more signals received from the user interface 45. In some implementations, the controller 202 causes adjustment of pitch automatically in response to a sensed or determined condition of the agricultural machine 10 (e.g., temperature, pressure, or load associated with one or more of the engine 55, radiator, charge air cooler, hydraulic oil cooler, air conditioner condenser, fuel cooler).

In the illustrative implementation, as shown in FIG. 5, the control system 200 further includes at least one fan sensor 210 configured to measure a parameter indicative of the speed of the fan 70. For example, the at least one fan sensor 210 may be a hall effect sensor configured to measure the rotational speed of the fan wheel 86. It should be appreciated that in some implementations, the at least one fan sensor 210 may be configured to measure the rotational speed of another component rotating with the fan 70 (e.g., the fan hub 72). Referring still to FIG. 5, the at least one fan sensor 210 is operatively coupled to the controller 202 and configured to send one or more signals to the controller 202 indicative of the speed of the fan 70.

In the illustrative implementation, as shown in FIG. 5, the control system 200 further includes at least one engine sensor 212 configured to measure a parameter indicative of the speed of the engine 55. For example, the at least one engine sensor 212 may be a hall effect sensor configured to measure the rotational speed of the drive wheel 84. It should be appreciated that in some implementations, the at least one engine sensor 212 may be configured to measure the rotational speed of another component rotating with the drive wheel 84, the engine 55, or both (e.g., drive unit 60). Referring still to FIG. 5, the at least one engine sensor 212 is operatively coupled to the controller 202 and configured to send one or more signals to the controller 202 indicative of the speed of the engine 55.

In the illustrative implementation, as shown in FIG. 5, the control system 200 further includes at least one load sensor 214 configured to measure a parameter indicative of the load on the belt 82. For example, the at least one load sensor 214 may be a torque sensor configured to measure the torque of at least one wheel of the pulley assembly 80 (e.g., drive wheel 84, fan wheel 86) or the torque of a component configured to rotate therewith. In other examples, the at least one load sensor 214 may be a tension sensor configured to measure a parameter indicative of the tension in the belt 82. For example, the tension sensor may be included in the tensioner 90 as a mechanical (e.g., spring), hydraulic, electric, or pneumatic sensor, which is configured to measure the tension in the belt 82 based on the force of the belt 82 acting on the tensioner 90. Referring still to FIG. 5, the at least one load sensor 214 is operatively coupled to the controller 202 and configured to send one or more signals to the controller 202 indicative of the load on the belt 82.

In some implementations, the control system 200 may be used for predicting failure of the variable pitch fan system 78. For example, referring to FIG. 6, an example method 600 of assessing a variable pitch fan system is shown. At block 602, at least one fan sensor 210 measures a parameter indicative of the speed of the fan 70. At block 604, at least one engine sensor 212 measures a parameter indicative of the speed of the engine 55. At a block 606, the controller 202 receives one or more signals from the at least one fan sensor 210 indicative of the speed of the fan 70. At a block 608, the controller 202 receives one or more signals from the at least one engine sensor 212 indicative of the speed of the engine 55. At a block 609, the controller 202 receives an indication of a pulley ratio between the drive wheel 84 and the fan wheel 86. In the illustrative implementation, the pulley ratio is the ratio of the diameter of the drive wheel 84 to the diameter of the fan wheel 86. In the illustrative implementation, the controller 202 receives an indication of the pulley ratio from the user interface 45, accesses the pulley ratio from the memory 208, or both. At a block 610, the controller 202 determines an expected speed of the fan 70 based on variable pitch fan system factors including at least: (i) the speed of the engine 55 based on the measured parameter associated therewith and (ii) the pulley ratio.

In some implementations, the controller 202 determines the expected speed of the fan 70 further based on a coefficient of friction between the belt 82 and at least one wheel (e.g., drive wheel 84, fan wheel 86) of the pulley assembly 80. In the illustrative implementation, the coefficient of friction is a value indicative of the frictional force resisting the motion of two surfaces in contact relative to the normal force pressing the two surfaces together. At a block 612, the controller 202 receives an indication of the coefficient of friction between the belt 82 and at least one wheel (e.g., drive wheel 84, fan wheel 86) of the pulley assembly 80. In the illustrative implementation, the indication is received from at least one of the user interface 45 and at least one friction sensor 216 of the agricultural machine 10.

In some implementations, the controller 202 determines the expected speed of the fan 70 further based on at least one ambient condition factor. In the illustrative implementation, the at least one ambient condition factor includes at least one of the ambient temperature and the air density surrounding the viable pitch fan system 78. At a block 614, the controller 202 receives an indication of the ambient condition factor. In the illustrative implementation, the indication is received from at least one of the user interface 45 and an ambient condition sensor 218 associated with the agricultural machine 10.

In some implementations, the controller 202 determines the expected speed of the fan 70 further based on an age of the belt 82. In the illustrative implementation, the age of the belt 82 may refer an amount of time the belt 82 been in existence, an amount of time since the belt was installed in the agricultural machine 10, or a quantity of uses of the belt 82. At a block 616, the controller 202 receives an indication of the age of the belt 82. In the illustrative implementation, the indication is received from the user interface 45, accessed from the memory 208, or both.

In some implementations, the controller 202 determines the expected speed of the fan 70 further based on a quantity of fan blade reversal events. At a block 618, the controller 202 receives an indication of the quantity of fan blade reversal events. In the illustrative implementation, the indication is received from the user interface 45, accessed from the memory 208, or both.

In some implementations, the controller 202 determines the expected speed of the fan 70 further based on the amount of tension in the belt 82. At a block 620, the controller 202 receives an indication of the amount tension in the belt 82. In the illustrative implementation, the indication is received from at least one of the user interface 45 and the least one load sensor 214.

In some implementations, the controller 202 determines the expected speed of the fan 70 further based the pitch of the plurality of blades 74. At a block 621, the controller 202 receives an indication of the pitch of the plurality of blades 74. In some implementations, the indication is received from at least one of the user interface 45 and a least one pitch sensor 220 of the agricultural machine 10. In some implementations, the indication is accessed by the controller 202 from the memory 208.

Figure 6:
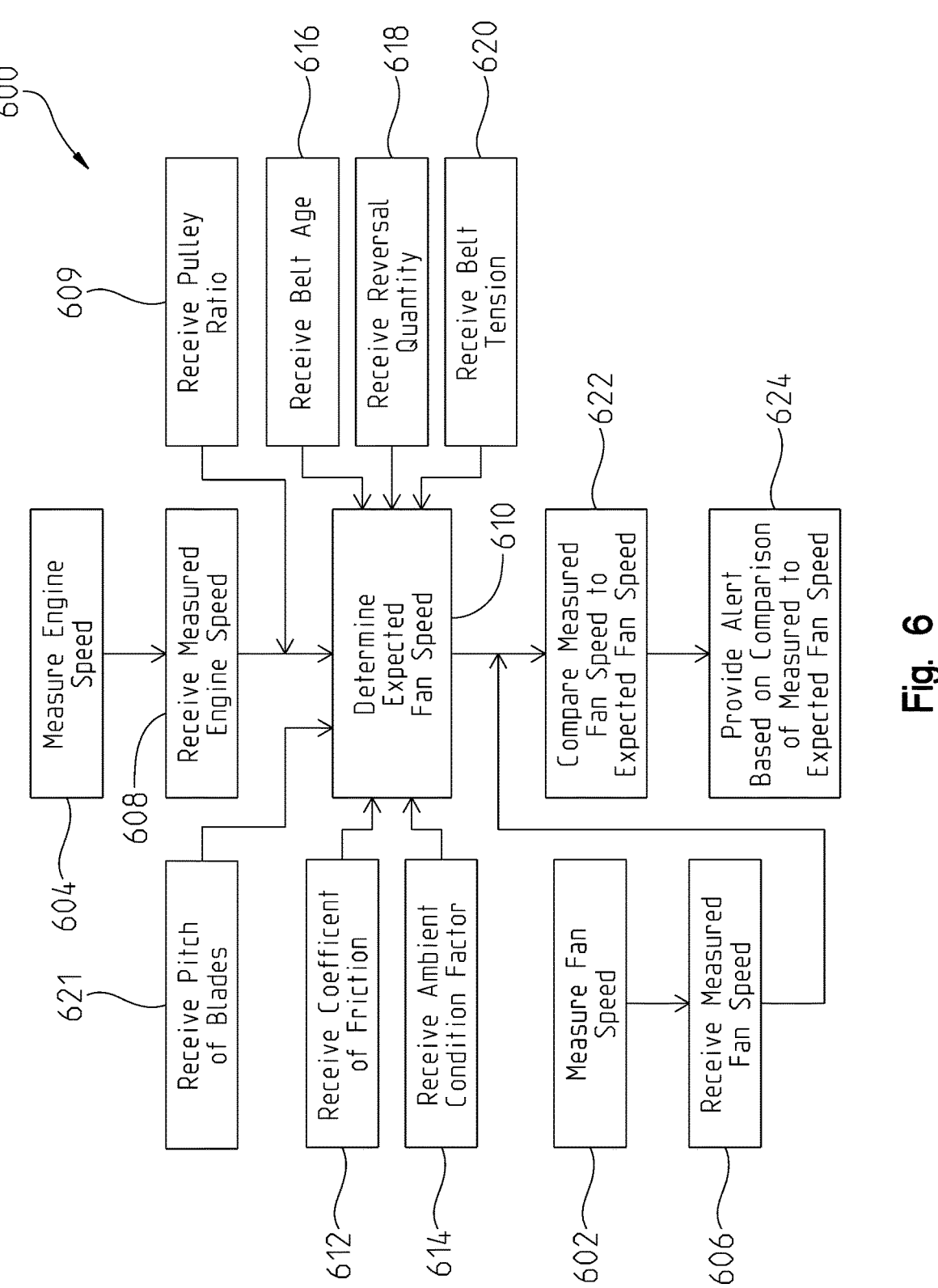
FIG. 6 is a flow diagram showing an example method for assessing a variable pitch fan system and providing a related alert.

Referring still to FIG. 6, in the illustrative implementation, at a block 622, the controller 202 compares an actual speed of the fan 70 (indicated by the measured parameter associated therewith) to the expected speed of the fan 70. For example, the controller 202 determines a fan speed error value based on the difference between the actual (i.e., measured) speed of the fan 70 and the expected speed of the fan 70. At a block 624, the controller 202 causes an alert to be provided based on the comparison between the actual (i.e., measured) speed of the fan 70 to the expected speed of the fan 70. For example, the controller 202 sends one or more signals to the user interface 45 of the agricultural machine 10 causing the user interface 45 to provide an alert (e.g., audio, visual, haptic) if the fan speed error value is outside a tolerance (e.g., stored in the memory 208) for the fan speed error value, e.g., equal to or greater than a maximum fan speed error value. In some implementations, the controller 202 determines a fan slip percentage, which is calculated as: fan slip percentage=(1−(measured fan speed/ expected fan speed))*100. In such implementations, the controller 202 causes the alert to be provided if the fan slip percentage is outside a tolerance (e.g., stored in the memory 208) for the fan slip percentage.

Figure 7:
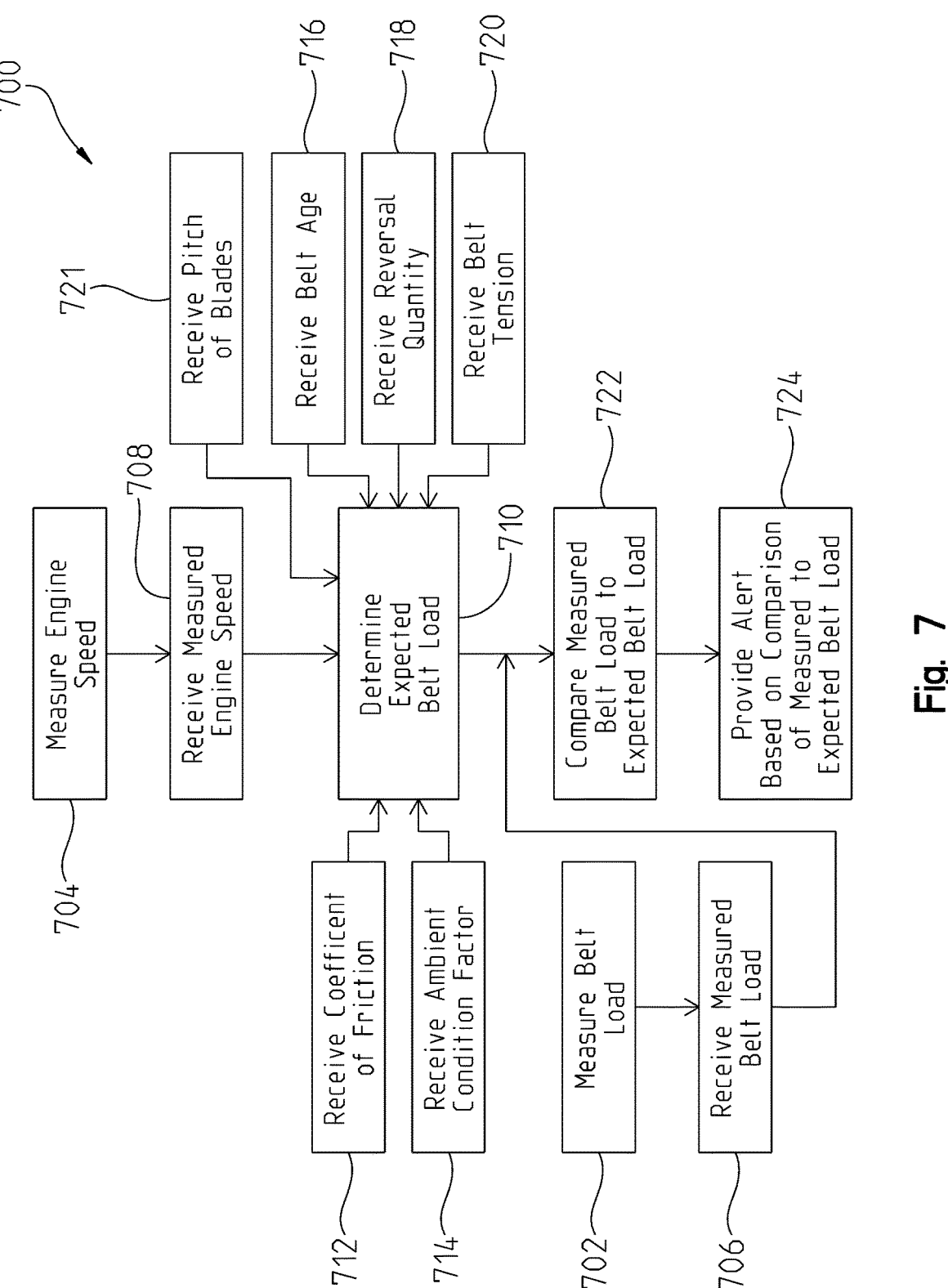
FIG. 7 is a flow diagram showing another example method for assessing a variable pitch fan system and providing a related alert.

Referring now to FIG. 7, an example method 700 of assessing a variable pitch fan system is shown. At block 702, at least one fan sensor 210 measures a parameter indicative of the load on the belt 82. At block 704, at least one engine sensor 212 measures a parameter indicative of the speed of the engine 55. At a block 706, the controller 202 receives one or more signals from the at least one load sensor 214 indicative of the load on the belt 82. At a block 708, the controller 202 receives one or more signals from the at least one engine sensor 212 indicative of the speed of the engine 55. At a block 710, the controller 202 determines an expected load on the belt 82 based on variable pitch fan system factors including at least the speed of the engine 55.

In some implementations, the controller 202 determines the expected load on the belt 82 further based on a coefficient of friction between the belt 82 and at least one wheel (e.g., drive wheel 84, fan wheel 86) of the pulley assembly 80. In the illustrative implementation, the coefficient of friction is a value indicative of the frictional force resisting the motion of two surfaces in contact relative to the normal force pressing the two surfaces together. At a block 712, the controller 202 receives an indication of the coefficient of friction between the belt 82 and at least one wheel (e.g., drive wheel 84, fan wheel 86) of the pulley assembly 80. In the illustrative implementation, the indication is received from at least one of the user interface 45 and the at least one friction 216 sensor of the agricultural machine 10.

In some implementations, the controller 202 determines the expected load on the belt 82 further based on at least one ambient condition factor. In the illustrative implementation, the at least one ambient condition factor includes at least one of the ambient temperature and the air density surrounding the viable pitch fan system 78. At a block 714, the controller 202 receives an indication of the ambient condition factor. In the illustrative implementation, the indication is received from at least one of the user interface 45 and an ambient condition sensor 218 associated with the agricultural machine 10.

In some implementations, the controller 202 determines the expected load on the belt 82 further based on an age of the belt 82. In the illustrative implementation, the age of the belt 82 may refer an amount of time the belt 82 been in existence, an amount of time since the belt was installed in the agricultural machine 10, or a quantity of uses of the belt 82. At a block 716, the controller 202 receives an indication of the age of the belt 82. In the illustrative implementation, the indication is received from the user interface 45, accessed from the memory 208, or both.

In some implementations, the controller 202 determines the expected load on the belt 82 further based on a quantity of fan blade reversal events. At a block 718, the controller 202 receives an indication of the quantity of fan blade reversal events. In the illustrative implementation, the indication is received from the user interface 45, accessed from the memory 208, or both.

In some implementations, the controller 202 determines the expected load on the belt 82 further based on the amount of tension in the belt 82. At a block 720, the controller 202 receives an indication of the amount tension in the belt 82. In the illustrative implementation, the indication is received from at least one of the user interface 45 and the least one load sensor 214.

In some implementations, the controller 202 determines the expected load on the belt 82 further based the pitch of the plurality of blades 74. At a block 721, the controller 202 receives an indication of the pitch of the plurality of blades 74. In some implementations, the indication is received from at least one of the user interface 45 and a least one pitch sensor 220 of the agricultural machine 10. In some implementations, the indication is accessed by the controller 202 from the memory 208.

Referring still to FIG. 7, in the illustrative implementation, at a block 722, the controller 202 compares an actual load on the belt (indicated by the measured parameter associated therewith) to the expected load on the belt 82. For example, the controller 202 determines a belt load error value based on the difference between the actual (i.e., measured) load on the belt 82 and the expected load on the belt 82. At a block 724, the controller 202 causes an alert to be provided based on the comparison between the actual (i.e., measured) load on the belt 82 and the expected load on the belt 82. For example, the controller 202 sends one or more signals to the user interface 45 of the agricultural machine 10 causing the user interface 45 to provide an alert (e.g., audio, visual, haptic) if the belt load error value is outside a tolerance (e.g., stored in the memory 208) for the belt load error value, e.g., equal to or greater than a maximum belt load error (absolute) value. In some implementations, the controller 202 determines a belt load error percentage based on: measured belt load and expected belt load. In some implementations, the measure belt load/expected belt load*100 results in the belt load error percentage. In such implementations, the controller 202 causes the alert to be provided if the belt load error percentage is outside a tolerance (e.g., stored in the memory 208) for the belt load error percentage.

While the disclosure has been illustrated and described in detail in the drawings and foregoing description, such illustration and description is to be considered as exemplary and not restrictive in character, it being understood that illustrative implementation(s) have been shown and described and that all changes and modifications that come within the spirit of the disclosure are desired to be protected. It will be noted that alternative implementations of the present disclosure may not include all of the features described yet still benefit from at least some of the advantages of such features. Those of ordinary skill in the art may readily devise their own implementations that incorporate one or more of the features of the present disclosure and fall within the spirit and scope of the present disclosure as defined by the appended claims.

The invention claimed is:

1. A variable pitch fan system for an agricultural machine comprising:
   an engine configured to produce power;
   a fan including a plurality of blades extending radially outward from an axis about which the plurality of blades rotates, the plurality of blades having variable pitch;
   a pulley assembly including:
      a drive wheel configured to be rotationally driven by the engine;
      a belt configured to be rotationally driven by the drive wheel; and
      a fan wheel configured to be rotationally driven by the belt to drive rotation of the plurality of blades of the fan; and
   a controller configured to receive one or more signals from at least one fan sensor indicative of a measured speed of the fan;
   wherein the controller is configured to receive one or more signals from at least one engine sensor indicative of a speed of the engine;
   wherein the controller is configured to determine an expected speed of the fan based on the one or more signals received from the at least one engine sensor;
   wherein the controller is configured to compare the measured speed of the fan to the expected speed of the fan;
   wherein the controller is configured to determine a fan speed error value based on a difference between the measured speed of the fan and the expected speed of the fan; and wherein the controller is configured to send one or more signals to a user interface causing the user interface to provide an alert if the fan speed error value is outside a tolerance for the fan speed error value.

2. The variable pitch fan system of claim 1, wherein, in a first configuration of the plurality of fan blades, the fan is configured to provide airflow in a first direction toward the engine and wherein, in an additional configuration of the plurality of fan blades, the fan is configured to provide airflow in a second direction away from the engine.

3. The variable pitch fan system of claim 1, wherein the at least one engine sensor is a hall effect sensor; and
   wherein the at least one fan sensor is a hall effect sensor.

4. The variable pitch fan system of claim 1, wherein the controller is configured to determine the expected speed of the fan further based on a pulley ratio between the drive wheel and the fan wheel.

5. The variable pitch fan system of claim 1, wherein the controller is configured to determine the expected speed of the fan further based on a coefficient of friction between the belt and at least one of the drive wheel and the fan wheel.

6. The variable pitch fan system of claim 1, wherein the controller is configured to determine the expected speed of the fan further based on at least one ambient condition factor, wherein the at least one ambient condition factor includes at least one of ambient air temperature and ambient air density.

7. The variable pitch fan system of claim 1, wherein the controller is configured to determine the expected speed of the fan further based on an age of the belt.

8. The variable pitch fan system of claim 1, wherein the controller is configured to determine the expected speed of the fan further based on a quantity of fan blade reversal events.

9. The variable pitch fan system of claim 1, wherein the controller is configured to determine the expected speed of the fan further based on a tension of the belt.

10. A method of assessing a variable pitch fan system for an agricultural machine comprising:
    measuring, with a fan sensor, a parameter indicative of a speed of a fan, the fan including a plurality of blades having variable pitch;
    measuring, with an engine sensor, a parameter indicative of a speed of an engine that is configured to produce power for the agricultural machine;
    receiving the parameter indicative of the speed of the fan and the parameter indicative of the speed of an engine;
    determining, with a controller, an expected speed of the fan based on the measured parameter indicative of the speed of the engine;
    determining, with the controller, a difference between the speed of the fan indicated by the measured parameter and the expected speed of the fan, wherein the difference is a fan speed error value; and
    providing, with a user interface, an alert if the fan speed error value is outside a tolerance for the fan speed error value.

11. A variable pitch fan system for an agricultural machine comprising:
    an engine configured to produce power;
    a fan including a plurality of blades extending radially outward from an axis about which the plurality of blades rotates, the plurality of blades having variable pitch;
    a pulley assembly including:
       a drive wheel configured to be rotationally driven by the engine;

a belt configured to be rotationally driven by the drive wheel; and a fan wheel configured to be rotationally driven by the belt to drive rotation of the plurality of blades of the fan;

a controller configured to receive one or more signals from at least one load sensor indicative of a measured load on the belt;

wherein the controller is configured to receive one or more signals from at least one engine sensor indicative of a speed of the engine;

wherein the controller is configured to determine an expected load on the belt based on the speed of the engine; and wherein the controller is configured to:

compare the measured load on the belt to the expected load on the belt;

determine a belt load error value based on a difference between the measured load on the belt and the expected load on the belt; and cause an alert to be provided by a user interface if the belt load error value is outside a tolerance for the belt load error value.

12. The variable pitch fan system of claim 11, wherein the controller is configured to determine the expected load on the belt further based on the pitch of the plurality of blades of the fan.

13. The variable pitch fan system of claim 11, wherein the controller is configured to determine the expected load on the belt further based on a density value of ambient air.

14. The variable pitch fan system of claim 11, wherein the controller is configured to determine the expected load on the belt further based on at least one of:

a coefficient of friction between the belt and at least one wheel of the pulley assembly;

an ambient condition factor including at least one of ambient air temperature and ambient air density;

an age of the belt;

a quantity of fan blade reversal events; and a measured tension value of the belt.

* * * * *